US006891475B2

(12) United States Patent
Bui et al.

(10) Patent No.: US 6,891,475 B2
(45) Date of Patent: May 10, 2005

(54) LOW-POWER PASSIVE TRANSPONDER

(75) Inventors: Ngoc-Chau Bui, Fontaines (CH); Christian Werner, Chez-le-Bart (CH); Yves Gaudenzi, La Chaux-de-Fonds (CH); Martial Benoit, Brot-Plamboz (CH); Vincent Cassi, La Sagne (CH); Christian Mirus, Belfaux (CH); Jean-Daniel Chatelain, Cottens (CH); Jacques Kowalczuk, Jougne (FR)

(73) Assignee: MBBS Holding S.A., Corcelles (CH)

( * ) Notice: Subject to any disclaimer, the term of this patent is extended or adjusted under 35 U.S.C. 154(b) by 10 days.

(21) Appl. No.: 10/333,301

(22) PCT Filed: Jul. 17, 2001

(86) PCT No.: PCT/CH01/00446

§ 371 (c)(1),
(2), (4) Date: Jun. 30, 2003

(87) PCT Pub. No.: WO02/09028

PCT Pub. Date: Jan. 31, 2002

(65) Prior Publication Data

US 2004/0155755 A1 Aug. 12, 2004

(30) Foreign Application Priority Data

Jul. 21, 2000 (FR) .............................................. 00 09625

(51) Int. Cl.[7] .......................... H04Q 5/22; G08B 13/14; H04L 7/02
(52) U.S. Cl. .................. 340/572.1; 340/10.1; 340/10.2; 340/10.3; 340/10.4; 340/10.5; 340/10.6; 340/825.54; 340/825.69; 340/825.72; 375/359; 375/360; 375/361
(58) Field of Search .......................... 340/825.2, 825.22, 340/7.33, 7.36–7.39, 10.1–10.6, 10.33, 10.34, 572.1, 825.54, 825.59, 825.72; 375/359–361

(56) References Cited

U.S. PATENT DOCUMENTS

| 3,590,386 | A | * | 6/1971 | Tisi et al. .................... 375/293 |
| 4,931,788 | A | * | 6/1990 | Creswick .................. 340/10.33 |
| 5,077,753 | A | * | 12/1991 | Grau et al. .................. 375/141 |
| 5,313,198 | A | | 5/1994 | Hirao et al. ........... 340/825.54 |
| 5,345,231 | A | * | 9/1994 | Koo et al. ............. 340/870.31 |
| 5,504,485 | A | * | 4/1996 | Landt et al. .................... 342/42 |
| 5,649,295 | A | * | 7/1997 | Shober et al. ............. 340/10.1 |
| 6,104,290 | A | * | 8/2000 | Naguleswaran .......... 340/572.1 |
| 6,198,382 | B1 | * | 3/2001 | Berger et al. ............ 340/10.34 |
| 6,272,325 | B1 | * | 8/2001 | Wiedeman et al. ......... 455/117 |

FOREIGN PATENT DOCUMENTS

EP          0 732 663         9/1996     ............ G06K/7/08

* cited by examiner

Primary Examiner—Jeffery Hofsass
Assistant Examiner—Lam Pham
(74) Attorney, Agent, or Firm—Young & Thompson

(57) ABSTRACT

The invention concerns a radio-frequency transponder (12) for contact-free identification with a reader (10), comprising: an antenna (24), an analog circuit (25) including a capacitor (32) an AC-DC converter (34), a modulator (40) and a demodulator (38), a logic control circuit (26), a storage unit (27). Said transponder (12) is designed such that: the antenna (24) and the capacitor (32) form together a resonant circuit, the clock extractor (36) processes the first signal (Tx) to extract therefrom a clock signal addressed to said modulator (38) as long as the voltage of said signal (Tx) exceeds a first threshold value, the converter (34) transforms the first signal (Tx) into a rectified signal, to power the transponder (12). The performances of the transponder, and more particularly energy recuperation and data transmission rate, are improved by the fact that the analog circuit comprises two clock extractors, one of low level type (35), the other of the high level type (36).

2 Claims, 5 Drawing Sheets

LEGEND:

14 Antenna
54 Time Base
56 Modulator
58 Demodulator
60 Decoder
62 Interface
64 Control Circuit

LEGEND:

72 Amplifier-Filter
74 Comparator
76 Multiplier
78 Inverter Type Multiplier
80 Low-Pass Filter
82 Sampling Circuit

LOW-POWER PASSIVE TRANSPONDER

FIELD OF THE INVENTION

The present invention relates to passive transponders with electromagnetic coupling, more particularly of the type having low power consumption.

BACKGROUND OF THE INVENTION

In known transponders, the analogue circuit further includes a clock extractor, of the low level or high level type.

When the extractor is of the low level type, the threshold value is constant. It is chosen to be sufficiently low so that the connection between the reader and transponder can occur even when transmission conditions are difficult. It must, however, be sufficiently high, as described in European Patent document No. 0732662, so that the damping time, necessary to reach the threshold value, is not too long when transmission conditions are good. This results in a compromise, which means that the pause time between two bits must be at least equal to ten periods of the sinusoidal signal.

SUMMARY OF THE INVENTION

The present invention concerns more particularly a radio-frequency for contactless identification by means of a reader. This transponder includes:

an antenna.

an analogue circuit that includes a capacitor, an AC-DC converter, a modulator and a demodulator, a logic control circuit, and a memory.

This transponder is arranged such that:

the antenna and the capacitor together form a resonating circuit.

the antenna receives a first signal originating from the reader, of the sinusoidal type, which has a peak voltage and is modulated and carries commands, and transmits a second signal carrying a response to the commands, the converter converts the first signal into a rectified signal in order to power the transponder.

With an extractor of the high level type, this pause time can be shortened, while keeping great flexibility of use, owing to the fact that the threshold vale is variable, defined with reference to the peak voltage of the signal received by the transponder.

Consequently, the time comprised between the end of the signal transmitted by the reader and its detection by the clock extractor is of the order of one period.

The time comprised between the beginning of a pause of the signal transmitted by the reader and its detection by the clock extractor is thus greatly reduced. This may, however, increase the time comprised between the beginning of the signal transmitted by the reader and its detection by the clock extractor. This is why, in order to further reduce the pause time, the analogue circuit further includes two clock extractors, one of the high level type, the other of the low level type, arranged such that the high level type extractor processes the first signal, received by the transponder, to extract therefrom a clock signal addressed to the demodulator as long as the peak voltage of the signal exceeds a first threshold value, and such that the low level type extractor defines a second threshold value, the two extractors being arranged such that the clock signal is interrupted as soon as the peak voltage of the first signal drops below the first threshold value, characteristic of the first extractor, and that it is re-established as soon as the voltage exceeds the second threshold value, characteristic of the second extractor.

Advantageously, the high level type extractor includes:

a PMOS type input transistor connected to the antenna, a polarized inverter including two transistors, one of the PMOS type and the other of the NMOS type, provided with an input and an output, and controlled by the input transistor, a peak value rectifier, formed of a diode and a capacitor, two current sources respectively powering the input transistor and the polarized inverter, and a simple inverter.

In this extractor, the peak value rectifier includes an input connected to the antenna and an output connected to the polarized inverter to apply thereto a supply voltage equal to the peak voltage of the first signal and in which the input of the polarized inverter is connected to the antenna through the input transistor, which offsets the signal downwards, the high level type extractor being arranged such that its detection threshold is defined by the supply voltage offset downwards by a value equal to the voltage difference defined by the threshold voltages of the two PMOS transistors, such that said dock signal is interrupted as soon as the peak voltage of the first signal drops below the detection threshold.

BRIEF DESCRIPTION OF THE DRAWINGS

Other advantages and features of the invention will appear from the following description, made with reference to the annexed drawings in which.

DETAILED DESCRIPTION OF THE PREFERRED EMBODIMENTS

Figure 1:
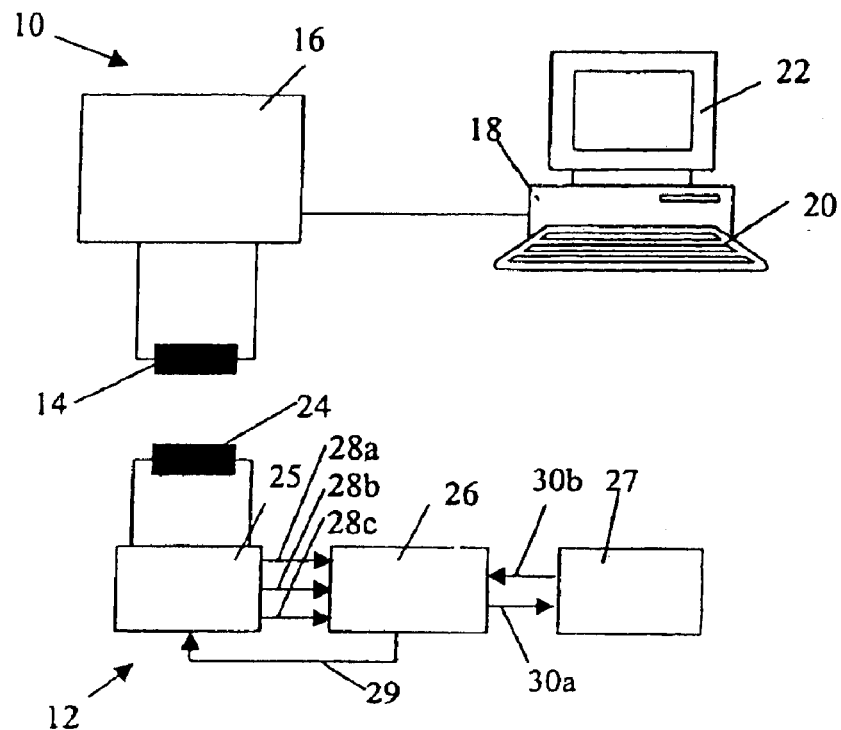
FIG. 1 shows schematically a transponder according to the invention and a reader for identifying the transponder.

The unit, shown in FIG. 1, includes a reader 10 and a transponder 12. Reader 10 includes, more precisely, an antenna 14 transmitting an electromagnetic signal Lx, an electronic control circuit 16, advantageously a microcontroller, as well as a computer 18 connected to a keyboard 20 and to a screen 22.

Transponder 12 is formed of an antenna 24, an analogue circuit 25, a logic control circuit 26 and a memory 27. Analogue circuit 25, which will be described in more detail hereinafter, is connected to the antenna, to receive the signal picked up by the latter. This signal carries out three functions, namely it:

supplies the transponder with electric energy, provides a clock signal, and transmits commands.

After processing, the signal is transmitted from analogue circuit 25 to logic circuit 26, by three connections 28a, 28b and 28c, respectively ensuring the transmission of energy, the clock and the serial input function. Logic circuit 26 addresses data to analogue circuit 25, via connection 29 of the "serial output" type. It introduces and will search for data in memory 27, respectively via connections 30a and 30b.

The commands are processed by logic circuit 26 from the data received and that contained in memory 27. A response is addressed, by logic circuit 26, to analogue circuit 25 so that it sends a return signal to reader 10.

Figure 2:
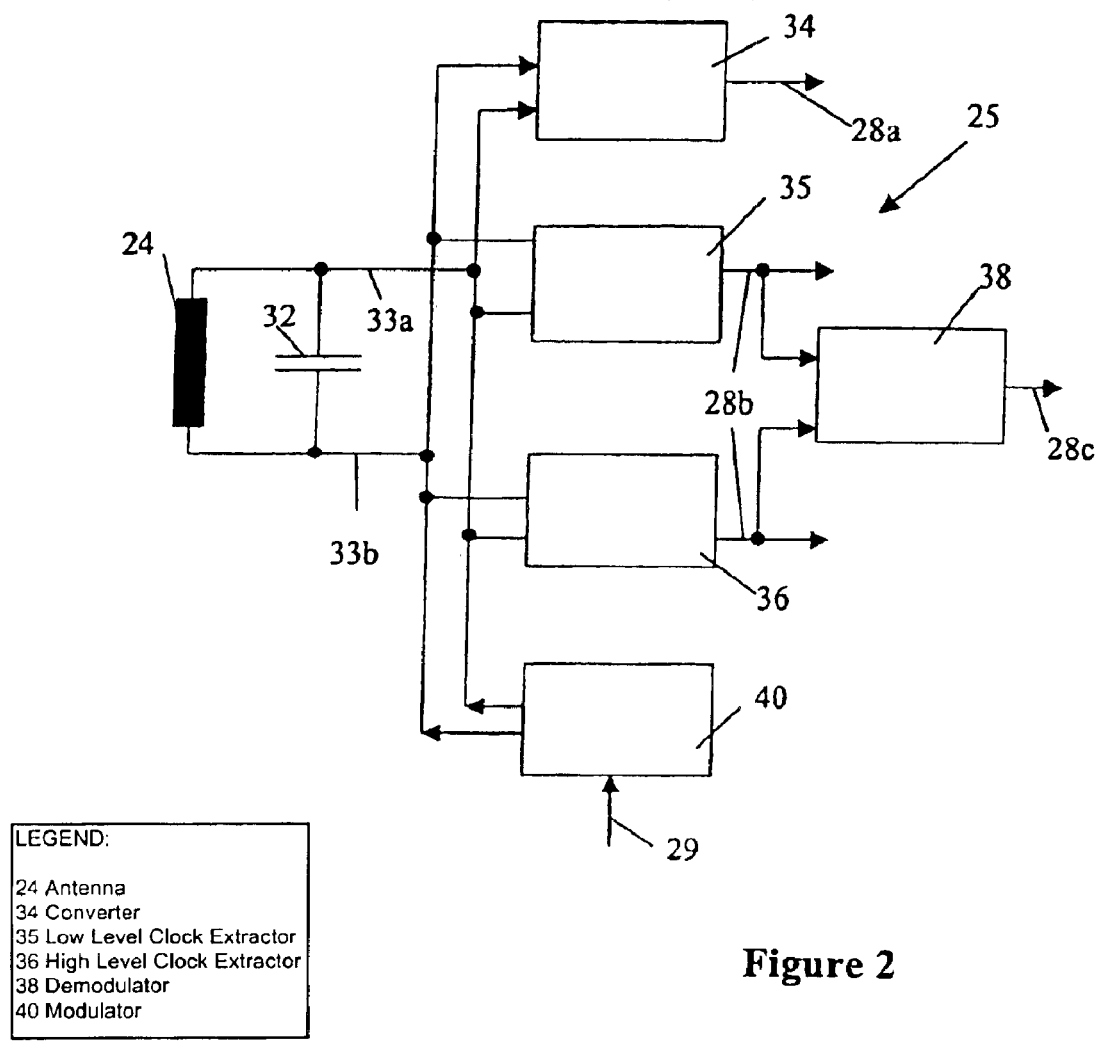
FIG. 2 shows a part of the transponder of FIG. 1, and more particularly its analogue circuit.

As FIG. 2 shows, analogue circuit 25 includes a capacitor 32, an AC-DC converter 34, a low level clock extractor 35 and a high level clock extractor 36, a demodulator 38 and a modulator 40.

Capacitor 32 forms, with antenna 24, a resonating circuit whose natural frequency is adjusted to the frequency of signal Lx transmitted by reader 10, and to whose terminals the inputs of converter 34, extractors 35 and 36, and the outputs of modulator 40 are connected, via connections 33a and 33b, such that the signal received by the transponder is applied to each of them and the signal transmitted by the transponder is applied to the antenna. Demodulator 38 receives, from antenna 24, its energy through converter 34, and the clock and commands through extractors 35 and 36.

This Figure again shows supply connection 28a, clock connection 28b and serial input connection 28c, forming the outputs of analogue circuit 25. Serial input connection 29, which allows data to be addressed from logic circuit 26 to analogue circuit 25, and more particularly to its modulator 40, will also be noted.

Converter 34 is, in a manner well known to those skilled in the art, formed of a full-wave rectifier with a large energy capacitor, powering a voltage stabilizer. It powers all of the parts of transponder 12.

Figure 3A:
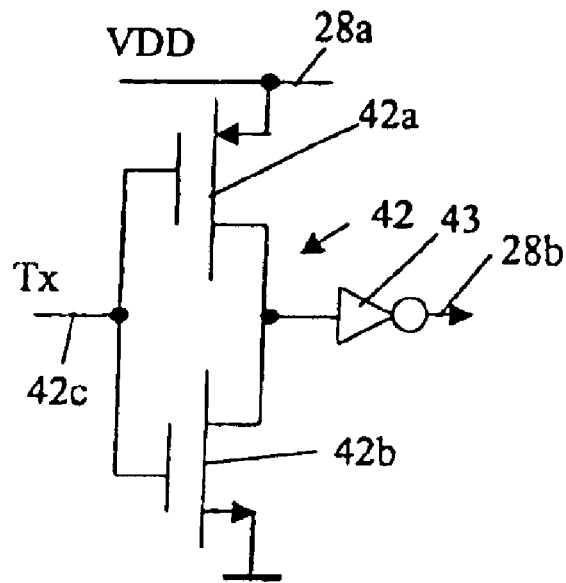
FIG. 3 illustrates schematically at a and b, diagrams of the low and high level extractors.

The low level type extractor is made by means of two simple inverters 42 and 43 in series, as shown in FIG. 3a. Inverter 42 is formed of a PMOS transistor 42a and a NMOS transistor 42b. It is powered by a stabilized voltage VDD provided by converter 34. Antenna 24 applies signal Tx to its input 42c. The dimensions of transistors 42a and 42b are calculated such that the threshold voltage Ub at which the circuit switches, is close to 1V.

An extractor of this type generates a clock signal each time that Tx is greater than 1V, this signal being interrupted when Tx descends below this level. Consequently, the clock signal is interrupted.

In normal operating conditions, the peak voltage $Tx_{max}$ is generally of the order of ten volts. With an antenna quality factor comprised between 15 and 30, approximately 3 to 6 cycles are required after the pause for voltage Tx to be permanently below 1V.

It would of course be possible to dimension the transistors such that threshold voltage Ub is higher. In this case, however, the transponder can no longer react normally when the received signal is close to Ub. This consequently reduces its sensitivity.

Figure 3B:
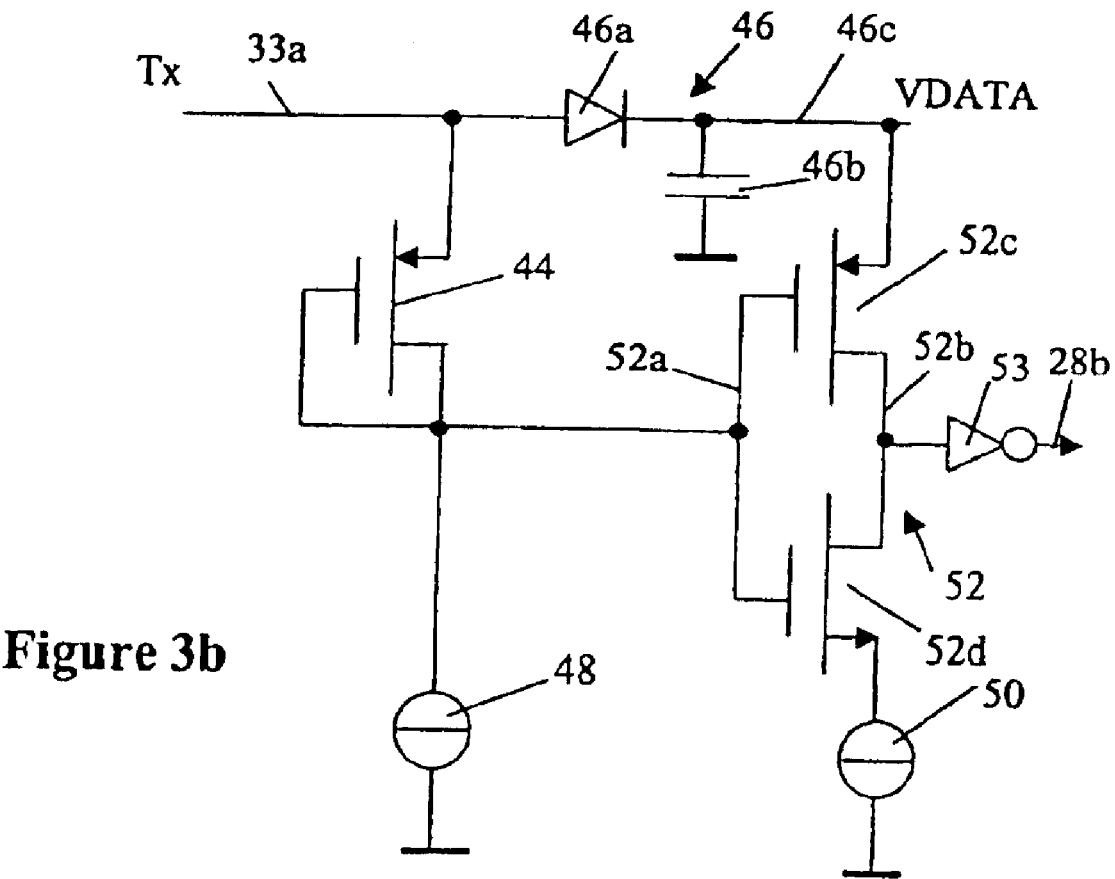

FIG. 3b shows in more detail the high level type extractor 36. It is formed of an input transistor 44, of the PMOS type and a peak value rectifier 46, both connected to the antenna by line 33a, of two current sources 48 and 50 and two inverters 52 and 53, one 52 being polarized, and the other 53 being simple.

More precisely, peak value rectifier 46 is formed of a diode 46a and a capacitor 46b. Its input is connected to antenna 24 by connection 33a and its output 46c to inverter 52 to apply a voltage VData thereto, equal to peak voltage $Tx_{max}$ of the signal received by the antenna through connection 33a.

Inverter 52 includes an input 52a and an output 52b, and two PMOS 52c and NMOS 52d transistors. Input 52a is connected to antenna 24 through transistor 44 which offsets the voltage of the antenna downwards by a value equal to its threshold value. Detection threshold Uh of the high level extractor is offset downwards with respect to VData by a value equal to the difference in the threshold voltages of PMOS transistors 44 and 52c. The latter are dimensioned such that the threshold voltage of transistor 52c is several hundred mV higher than the threshold voltage of transistor 44. Consequently, the clock signal is interrupted as soon as the voltage of signal Tx received by the antenna drops by a value equal to the difference between the two threshold voltages, whatever the value of peak voltage $Tx_{max}$.

Figure 4:
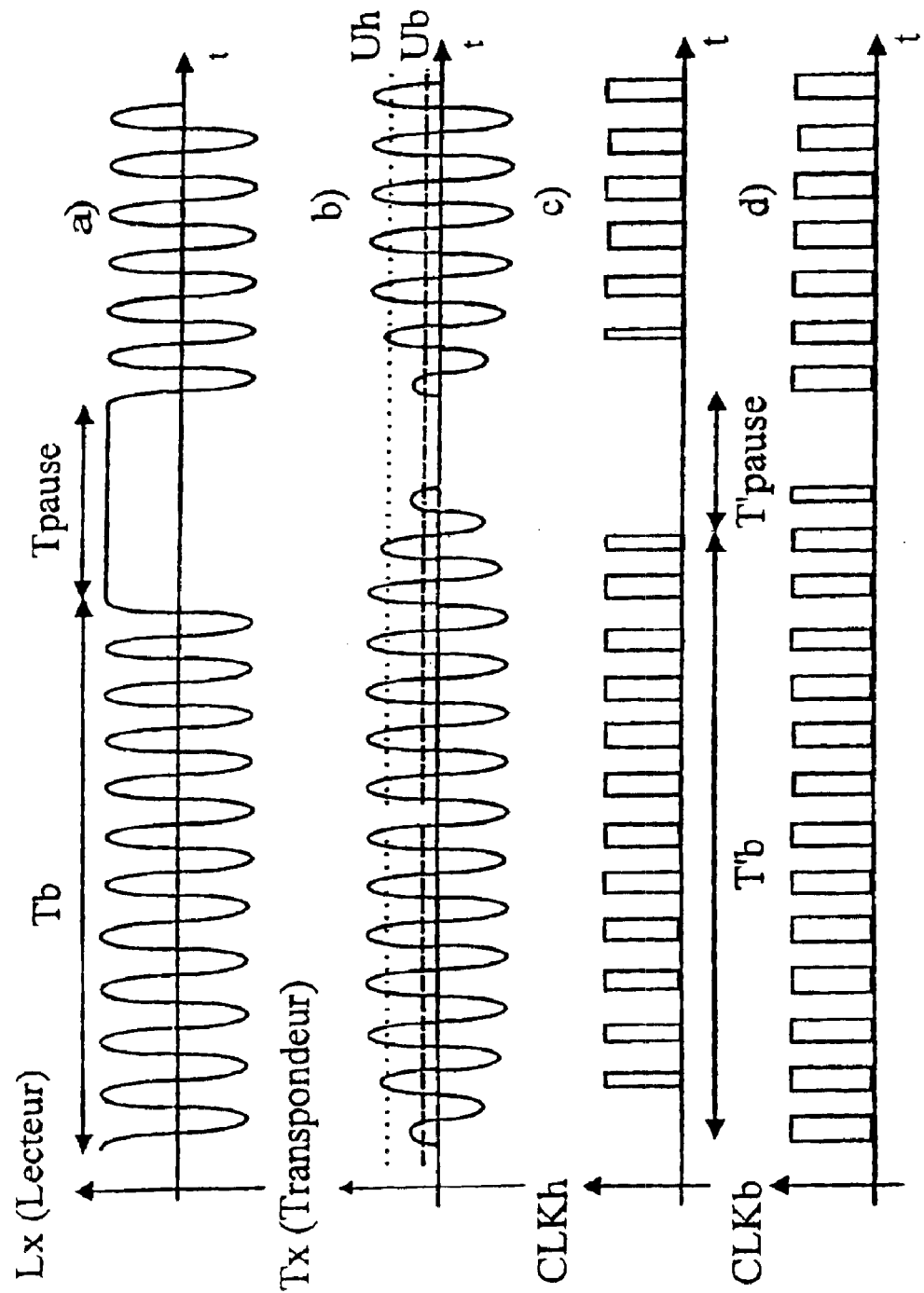
FIG. 4 shows respectively on lines a to d, the measured voltage curves at the terminals of the reader antenna, the transponder antenna and high and low clock signals.

In order to be able to understand properly the operation of the clock extractors, FIG. 4 shows schematically respectively on lines a, b, c and d, signal Lx transmitted by reader antenna 14, signal Tx received by transponder 12 and the high and low level clock signals CLKh and CLKb.

On line a, it will be noted that the reader antenna transmits a sinusoidal signal, which is periodically interrupted, when the voltage is maximum.

When the voltage of signal Lx becomes constant, signal Tx at the terminals of antenna 24 of transponder 12 decreases, as can be seen on line b, more or less quickly, the speed being lower the higher the quality factor. Peak voltage $Tx_{max}$ is higher, the higher the received signal. However, when the voltage exceeds a limit value, the signal is saturated.

At the start of a signal Lx transmitted by the reader, the high and low level clock signal extractors 36 and 35 both respond very quickly, as can be seen on lines c and d. However, in poor reception conditions, high clock signal CLKh may only appear after several periods of signal Lx transmitted by the reader. When reader 10 interrupts transmission of the sinusoidal signal, it will be noted that signal Tx received by antenna 24 is damped slowly. This is due to the fact that the quality factor of the oscillating circuit, that if forms with capacitor 32, is high.

Because of this slow damping, several periods are needed before low level extractor 35 reacts, whereas signal CLKh derived from high level extractor 36 is interrupted in synchronism.

It thus appears clearly that if the signal received is regular and intense, one need only have a high level extractor in the transponder in order to be able to considerably reduce the pause time. However, when the received signal is not saturated, it is then desirable to have high and low level extractors, which then allows a pause of short duration to be guaranteed. It is thus possible to transmit the maximum amount of energy and a significant number of data even when the carrier frequency is low.

Figure 5:
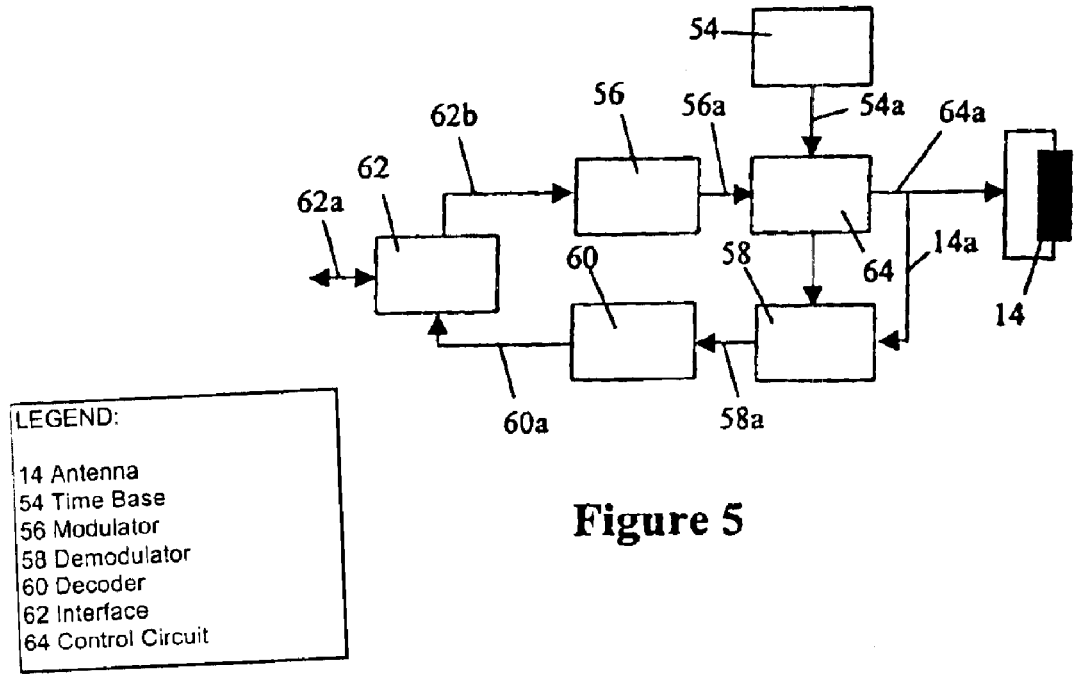
FIG. 5 shows schematically a reader for the transponders according to the invention, a part of the latter being illustrated in more detail in FIG. 6.
Figure 6:
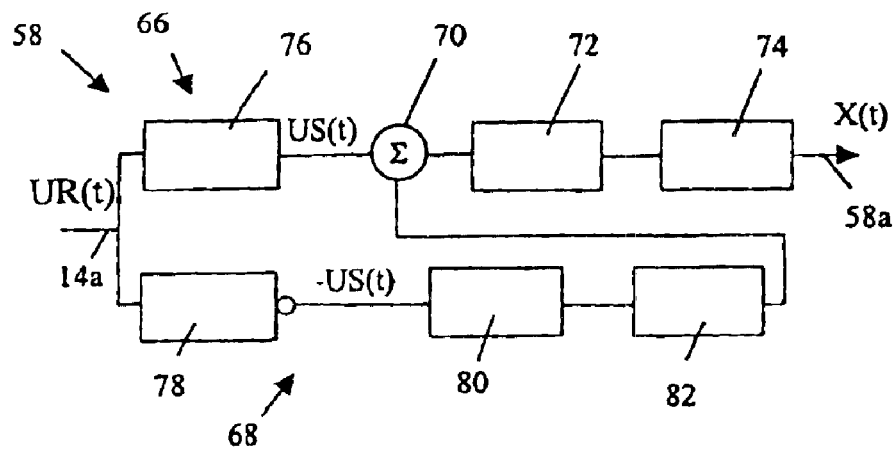

FIGS. 5 and 6 show, in more detail, the structure of electronic control circuit 16 fitted to reader 10.

Electronic control circuit 16 is formed of a time base 54, a modulator 56, a demodulator 58, a decoder 60, a communication interface 62 and a control circuit 64.

Time base 54 is connected to control circuit 64, by a connection 54a, through which it supplies a sinusoidal signal of constant frequency, advantageously comprised between 9 and 150 kHz, which acts as the carrier. Control circuit 64 receives from modulator 56, via a connection 56a, data which allow it to modulate the carrier signal to address data to a transponder arranged in proximity to the reader, via antenna 14 which is connected to control circuit 64 by means of a connection 64a.

Antenna 14 is connected to demodulator 58 by a connection 14a. Thus, when the transponder replies to the reader data, the signal that it addresses, picked up by antenna 14, is received by demodulator 58, through connection 14a. Demodulator 58 processes this signal and the data that it contains is addressed to decoder 60 through a connection 58a. Decoder 60 interprets this data on the basis of stored data and transmits it to interface 62 through a connection 60a. Interface 62 is connected to the exterior, by a connection 62a, formed for example of an RS line 232, to ensure the transmission of commands and data to man-machine interfaces. It is also connected to modulator 56, by a connection 62b.

Thus, when an operator wishes to identify an object provided with a transponder and arranged in the field of reader 10, he gives an order by means of keyboard 20. This order is managed by computer 18 and sent to electronic control circuit 16 via connection 62a. Interface 62 addresses this order to modulator 56. The latter cooperates with control circuit 64 to modulate the carrier signal derived from time base 54.

As has already been stressed hereinbefore, it is difficult to read the signals received by antenna 14, since they are of a very low level. Demodulator 58, shown in detail in FIG. 6, allows efficient reading to be ensured. It includes first and second channels 66 and 68, arranged in parallel, an adder 70 connected to the outputs of channels 66 and 68, an amplifier-filter 72 and a comparator 74 arranged in series at the output of adder 70.

Channel 66 is formed of a multiplier 76. Channel 68 includes an inverter type multiplier 78, a low-pass filter 80 and a sampling circuit 82.

The two channels 66 and 68 are together connected to the antenna by connection 14a. They therefore both receive the signal UR(t) originating from antenna 14. This modulated signal includes two components, one corresponding to the transmitted signal and the other to the picked up signal, originating from the transponder. Decoder 58 has the task of extracting the signal X(t) which corresponds to the component originating from the transponder.

In a first operation, the signal is multiplied by itself by multipliers 76 and 78, the latter further inverting the resulting signal. In other words, signal US(t) derived from multiplier 76 is equal to the square of UR(t), whereas the signal derived from multiplier 78 is equal, but with the reverse sign.

Signal −US(t), derived from multiplier 78, is then processed, in a conventional manner, by means of low-pass filter 80, then by sampling circuit 82.

In the device described, reader 16 is the master as regards the transponder. In other words, the reader can find out at any moment when a transponder is likely to respond to an interrogation. Just before the response signal begins, sampling circuit 82 stores the mean value of signal US−(t−Δt) provided by filter 80. It is this stored signal that is added to signal US(t). After amplification and filtering by amplifier-filter 72, then comparison by comparator 74, the result of this addition allows X(t), which includes all data derived from the transponder, to be extracted, whereas the signal originating from the carrier has been removed.

It is quite clear that the transponder and the reader as they have been described can be subject to numerous variants, without thereby departing from the scope of the invention.

Thus, due to the fact that the transponders according to the invention are provided with a high level extractor, moreover associated with a low level extractor, it is possible to reduce to a minimum the interruptions in the signal transmitted by antenna 14, carrying data to be transmitted, and thus to ensure optimum conditions for data and energy transmission between the reader and the transponders, even in particularly unfavourable conditions, for example in the presence of a metal screen comprised between antennae 14 and 24.

What is claimed is:

1. Radio-frequency transponder (12) for contactless identification by means of a reader (10), including:,
   an antenna (24)
   an analogue circuit (25) that includes a capacitor (32), an AC-DC converter (34), a modulator (40) and a demodulator (38),
   a logic control circuit (26), and
   a memory (27)
   said transponder (12) being arranged such that:
   the antenna (24) and the capacitor (32) together form a resonating circuit,
   the antenna (24) receives a first signal (Tx) originating from said reader (10), reader being sinusoidal having a peak voltage ($Tx_{max}$) and is modulated and carries commands, and transmits a second signal (Rx) carrying a response to the commands,
   said converter (34) converts the first signal (Tx) into a rectified signal in order to power the transponder (12) characterized in that said analogue circuit (25) further includes two clock extractors, one a high level extractor (36), the other low a level extractor (35), arranged such that the high level extractor (36) processes the first signal (Tx) in order to extract therefrom a clock signal addressed to the demodulator (38) as long as the peak voltage of this signal (Tx) exceeds a first threshold value, and such that the low level extractor (35) defines a second threshold value, said extractors being arranged such that the clock signal is interrupted as soon as the peak voltage of the first signal drops below said first threshold value, characteristic of the high level extractor, and such that it is re-established as soon as said voltage exceeds said second threshold value, characteristic of the low level extractor.

2. Transponder according to claim 1, characterized in that the high level extractor (36) includes:
   a PMOS input transistor (44) connected to the antenna (24),
   a polarized inverter (52) including two transistors, one PMOS transistor (52c) and the other a NMOS transistor (52d), provided with an input (52a) and an output (52b), and controlled by the input transistor,
   a peak value rectifier (46), formed of a diode (46a) and a capacitor (46b),
   two current sources (48,50) respectively powering the input transistor (44) and the polarized inverter (52), and
   a simple inverter (53)
wherein the peak value rectifier (46) includes an input (33a) connected to the antenna (24) and an output (46c) connected to the polarized inverter (52) to apply thereto a supply voltage (VData) equal to the peak voltage ($Tx_{max}$) of the first signal (Tx) and in which the input (52a) of the polarized inverter (52) is connected to the antenna (24) through the input transistor (44), which offsets the signal (Tx) downwards, the high level extractor (36) being arranged such that its detection threshold (Uh) is defined by the supply voltage (VData) offset downwards by a value equal to the voltage difference defined by the threshold voltages of the two PMOS transistors (52c), such that said clock signal is interrupted as soon as the peak voltage ($Tx_{max}$) of the first signal (Tx) drops below the detection threshold (Uh).

* * * * *